(12) United States Patent
Hoshikawa

(10) Patent No.: US 10,099,461 B2
(45) Date of Patent: Oct. 16, 2018

(54) DEVICE FOR STICKING FILM ON DISPLAY SCREEN

(71) Applicant: Trinity, Inc., Niiza-shi, Saitama (JP)

(72) Inventor: Tetsushi Hoshikawa, Niiza (JP)

(73) Assignee: TRINITY, INC., Niiza-Shi, Saitama (JP)

(*) Notice: Subject to any disclaimer, the term of this patent is extended or adjusted under 35 U.S.C. 154(b) by 0 days.

(21) Appl. No.: 15/565,724

(22) PCT Filed: Apr. 13, 2015

(86) PCT No.: PCT/JP2015/061399
§ 371 (c)(1),
(2) Date: Oct. 11, 2017

(87) PCT Pub. No.: WO2016/166803
PCT Pub. Date: Oct. 20, 2016

(65) Prior Publication Data
US 2018/0117892 A1    May 3, 2018

(51) Int. Cl.
| B32B 37/00 | (2006.01) |
| B29C 63/00 | (2006.01) |
| B29C 63/02 | (2006.01) |
| H04M 1/02 | (2006.01) |

(52) U.S. Cl.
CPC ...... *B32B 37/0046* (2013.01); *B29C 63/0004* (2013.01); *B29C 63/02* (2013.01); *H04M 1/02* (2013.01); *B29C 2063/0008* (2013.01); *B29C 2063/027* (2013.01); *B32B 2457/20* (2013.01)

(58) Field of Classification Search
CPC . B32B 2457/20; B29C 63/02; B29C 63/0004; B29C 2063/027; B29C 2063/0008
USPC .......................................................... D9/457
See application file for complete search history.

(56) References Cited

U.S. PATENT DOCUMENTS

| D445,336 S | * | 7/2001 | Hepworth | ...................... D9/415 |
| 2007/0021068 A1 | * | 1/2007 | Dewhurst | .............. G11B 31/02 |
| | | | | 455/42 |
| 2012/0110868 A1 | * | 5/2012 | Abbondanzio | ..... B29C 63/0004 |
| | | | | 33/645 |

(Continued)

FOREIGN PATENT DOCUMENTS

| JP | 3180690 | 12/2012 |
| JP | 2013056525 | 3/2013 |

(Continued)

OTHER PUBLICATIONS

International Search Report dated Jul. 14, 2015.

*Primary Examiner* — Mark A Osele
(74) *Attorney, Agent, or Firm* — Jacobson Holman, PLLC.

(57) ABSTRACT

A device for sticking a film on a display screen of a mobile device, the device including: a film holder for sticking a film main body on the display screen, the film holder having a protruding engagement piece which is inserted into and fixed to a connector on the side of the mobile device which serves as an engagement partner and a positioning means for the film main body, the film holder has at least two positioning projections and the film main body has the same number of positioning holes which are commensurate with the positioning projections.

3 Claims, 5 Drawing Sheets

(56) References Cited

U.S. PATENT DOCUMENTS

| | | | | |
|---|---|---|---|---|
| 2014/0047708 A1* | 2/2014 | Chae | ........................ | H04W 4/00 29/700 |
| 2014/0338829 A1* | 11/2014 | Peng | ................... | B29C 63/0004 156/249 |
| 2017/0190160 A1* | 7/2017 | Peng | ................... | B32B 38/1841 |

FOREIGN PATENT DOCUMENTS

| | | | | |
|---|---|---|---|---|
| JP | 2014002246 | | 1/2014 | |
| JP | 2014166727 | | 9/2014 | |
| JP | 2014525167 | | 9/2014 | |
| JP | 2015111194 | | 6/2015 | |
| WO | WO-2014021486 A1 * | 2/2014 | ............. | B29C 63/02 |
| WO | 2014045468 | | 3/2014 | |
| WO | 2015037054 | | 3/2015 | |

* cited by examiner

DEVICE FOR STICKING FILM ON DISPLAY SCREEN

BACKGROUND OF THE INVENTION

The present invention relates to a device for sticking a film on a display screen of a mobile device.

BACKGROUND ART

A mobile device such as a mobile phone which includes iPhone (registered trademark) is provided with a display screen which is configured of liquid crystal, inorganic or organic EL, or the like. Since there is a concern that the display screen may be damaged during use, protection of the screen with a resin film such as PET has been performed. Such a protective film is stuck on the display screen by peeling off a release layer and exposing an adhesive layer. However, there is a problem in that a sticking position cannot be determined accurately or air bubbles enter. Further, there is also a case where if the finger touches the adhesive layer, an adhesive force decreases due to sebum.

The above problem is also an interrelated matter such as touch of the finger occurring due to being worried about air bubbles, or accurate positioning being unable to be performed due to being worried about tilting, and therefore, it is not always easy to accurately stick the protective film. Therefore, it is very difficult to overcome a problem in that the protective film is shifted or tilted up and down or from side to side with respect to the screen. For this reason, various proposals have been made in order to assist film sticking.

For example, the invention of Japanese Unexamined Patent Application Publication No. 2014-166727 discloses a sticking auxiliary tool which is fitted and fixed to a mobile device such that the positioning of a protective film to be stuck can be performed. The auxiliary tool is large in size because it is composed of a frame which is fitted to the mobile device, and when the auxiliary tool is removed after film sticking, there is a concern that it may be caught on an edge of the film, thereby damaging the finish.

On the other hand, the invention of Japanese Unexamined Patent Application Publication No. 2014-525167 discloses a tool for sticking a protective film. However, the tool has a configuration basically similar to that of the above-mentioned invention in that a frame conforming to the outer shape the mobile device is required. The auxiliary tools using such a frame configuration are uneconomical due to a size larger than the film and an increase in expense. Further, in use, attention must be paid to both the sticking of the film held on the frame and the mounting and dismounting of the frame on and from the mobile device, and thus it seems that it is not always easy to achieve the purpose.

CITATION LIST

Japanese Unexamined Patent Application Publication No. 2014-166727
Japanese Unexamined Patent Application Publication No. 2014-525167

BRIEF SUMMARY OF THE INVENTION

The present invention has been made in view of the above-mentioned points, and an object of the present invention is to enable accurate sticking of a film on a display screen with a simple film holder without relying on a technique. Further, another object of the present invention is to provide a film sticking device in which it is possible to proceed with work while visually confirming the positional relationship between a film and a display screen.

In order to achieve the above objects, according to the present invention, there is provided a device for sticking a film on a display screen of a mobile device, the device including: a film holder for sticking a film main body on the display screen, the film holder having a protruding engagement piece which is inserted into and fixed to a connector on the mobile device side, which serves as an engagement partner, in which as positioning means for the film main body, the film holder has at least two positioning projections and the film main body has the same number of positioning holes which are fitted to the positioning projections. Therefore, the film holder is fixed to the mobile device, the film main body is positioned on the film holder by using the positioning means, and in this state, the film main body can be accurately stuck on the display screen.

The film sticking device according to the present invention uses the connector on the mobile device side as an engagement partner. For this reason, mounting and dismounting can be very easily performed at an end portion or the like of the mobile device, and therefore, the problem associated with the mounting and dismounting, as in the related art, does not occur.

For this reason, the film sticking device according to the present invention has a configuration in which it has a film holder for sticking a film main body on the display screen, the film holder having a protruding engagement piece which is inserted into and fixed to a connector on the mobile device side, which serves as an engagement partner.

The engagement piece of the film holder is inserted into the connector of the mobile device, whereby the film holder comes into contact with the mobile device at portions other than the engagement piece, so that the film holder is mounted without tilting. In the film holder, small protrusion portions which come into contact with the mobile device side to define a position being provided on both right and left sides with the engagement piece interposed therebetween is preferable for the prevention of tilting in the present invention.

Further, as the positioning means for the film main body, the film holder has at least two positioning projections and the film main body has the same number of positioning holes which are fitted to the positioning projections. For the positioning of the film main body with respect to the film holder, it is sufficient if at least two positioning projections and at least two positioning holes are provided.

However, a configuration is more preferable in which three positioning projections and three positioning holes are provided and the three positioning projections and the three positioning holes are disposed right-left asymmetrically. This is because of exhibiting the effect that due to such a configuration, the positional relationship between the film main body and the film holder is uniquely determined, so that it is possible to prevent a positioning error.

As described above, it is possible to make a configuration so as to fix the film holder to the mobile device, position the film main body on the film holder by using the positioning means, and accurately stick the film main body on the display screen in that state. The film holder needs to have only the engagement piece, the positioning projections, and the small protrusion portions, and therefore, the film holder has a simple configuration and is downsized.

The film main body has a three-layer structure in which it has, on one side, a release layer attached to an adhesive layer which is stuck on the display screen and has, on the other side, a skin layer for preventing damage to the film. Further, as the film main body, a film main body is preferably used which has substantially the same size and shape as the display screen, and in which the positioning holes are located at an end portion in the longitudinal direction of the film main body, and the release layer is divided into two parts at an intermediate portion in the longitudinal direction.

Unlike the auxiliary tools described in the patent literature, if the connector of the mobile device is compatible (most of the mobile devices are provided with either a Lightning (registered trademark) connector for iPhone (registered trademark) or a micro-USB (trademark) connector), the film holder of the device according to the present invention can be fixed by inserting the engagement piece into the connector. Therefore, it is possible to deal with it by a design change of the position or the like of the hole on the film main body side, and a jig, that is, the film holder itself is applied to almost all the mobile devices, so that there is no need to make many types of resin molds, enabling significant cost reduction.

The present invention is configured and operates as described above, and therefore, the effect that it is possible to accurately stick a film on a display screen with a simple film holder without relying on a technique is exhibited. Further, according to the present invention, by fixing the film holder to the mobile device and positioning the film main body on the film holder by using the positioning means, it is possible to proceed with work while visually confirming the positional relationship between the film and the display screen, and thus a sense of security and reliability can be obtained.

BRIEF DESCRIPTION OF THE DRAWINGS

FIG. 1 consists of FIGS. 1A and 1B and are diagrams showing an example of a film holder in a device for sticking a film on a display screen according to the present invention, in which

FIG. 2 consists of FIGS. 2A and 2B and are diagrams showing an example of the film holder, in which

FIG. 4 consists of FIGS. 4A, 4E and 4C and are diagrams showing a method of using the device, in which

FIG. 5 consists of FIGS. 5A and 5B and are diagrams showing the method of use, in which

DETAILED DESCRIPTION OF THE INVENTION

Hereinafter, the present invention will be described in more detail with reference to the illustrated embodiment.

Figure 1A:
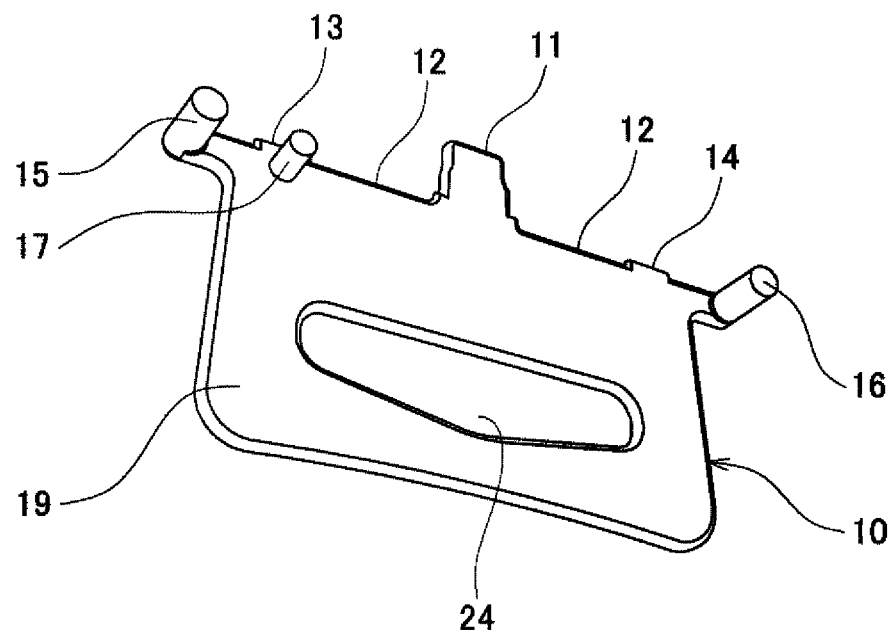
FIG. 1A is a perspective view and FIG. 1B is a side view.
Figure 1B:
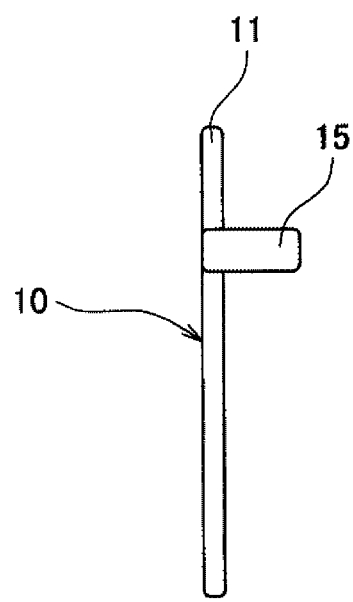
Figure 2A:
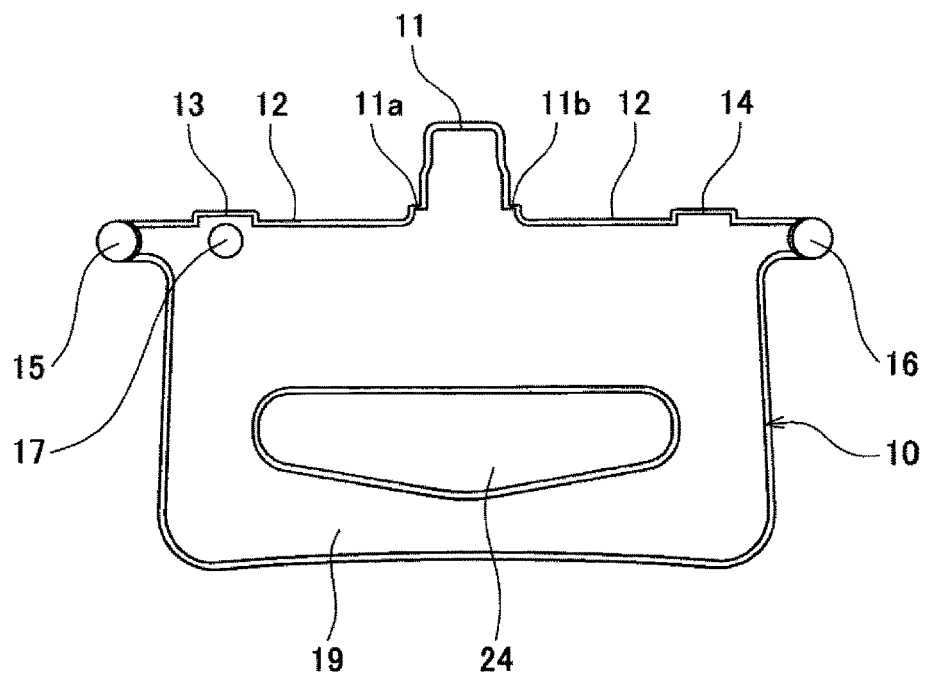
FIG. 2A is a front view and FIG. 2B is a bottom view.
Figure 2B:
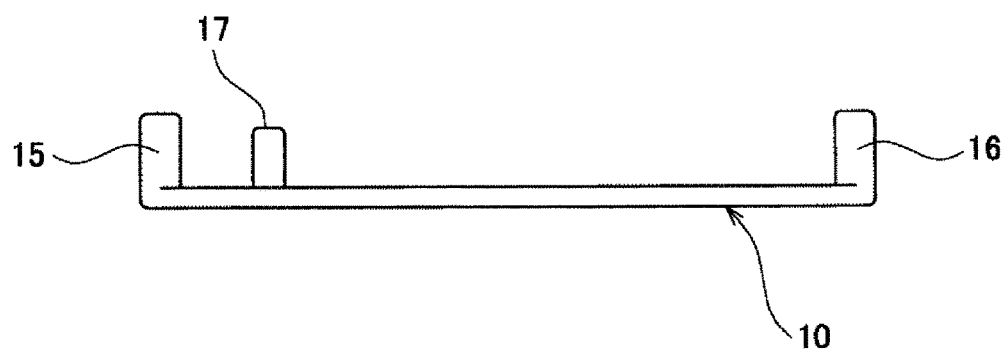

FIGS. 1A and 1B show a film holder 10 consisting of a device for sticking a film on a display screen according to the present invention, and the film holder 10 shown in the drawings has a flat plate shape and has a protruding engagement piece 11 which is inserted into and fixed to a connector on the mobile device side, which serves as an engagement partner.

The film holder 10 has a flat plate-shaped outer shape having an overall width substantially equal to the lateral width of a mobile device M, and a length in a longitudinal direction, which is shorter than the overall width. The mobile device M shown in the drawings has a longitudinally long form, and therefore, on the basis of the shape, a long side direction thereof is identified as the longitudinal direction and the direction orthogonal thereto is identified as the lateral direction, and the top and bottom and the right and left are defined on the basis of the long side direction.

In the film holder 10, a portion corresponding to a lower side B of the mobile device M serves as a reference for positioning thereof with respect to a display screen D. Therefore, the film holder 10 is first positioned with respect to the mobile device M by bringing an upper side 12 thereof into contact with the lower side B. Therefore, in this position, small protrusion portions 13 and 14 which come into contact with the lower side B of the mobile device to define a position are provided on the upper sides 12 on both right and left sides with the engagement piece 11 interposed therebetween.

For the same purpose, small protrusion portions 11a and 11b are also provided on both sides of a base portion of the engagement piece 11. Accordingly, the small protrusion portions 11a, 11b, 13, and 14 come into contact with the lower side B of the mobile device M, whereby the positioning of the film holder 10 with respect to the mobile device M is accurately performed (refer to FIG. 4B). Further, since the small protrusion portions 11a and 11b come into contact with the lower side B when the engagement piece 11 is inserted into a connector C on the mobile device side, the small protrusion portions 11a and 11b also serve as stoppers to limit the insertion.

In the film holder 10, at least two positioning projections 15 and 16 are provided as one of positioning means 18. Further, in this embodiment, a third positioning projection 17 is provided. The third positioning projection 17 is located at a position that is disposed asymmetrically right-left in relationship with the two positioning projections 15 and 16.

The positioning projections 15, 16, and 17 protrude from only one surface side of the film holder 10. Further, the positioning projections 15, 16, and 17 are disposed asymmetrically right-left, whereby the positional relationship between a film main body 20 and the film holder 10 is uniquely determined.

Further, in this embodiment, as the other of the positioning means 18 for the film main body 20, the same number of positioning holes 21, 22, and 23 which are commensurate to the positioning protrusions 15, 16, and 17 are provided on the side of the film main body 20. In each of the drawings, reference numeral 19 denotes a film holding plate part, which has an opening portion 24 for handling the film holder 10.

The film main body 20 has a three-layer structure (not shown) in which it has, on one side, a release layer attached to an adhesive layer which is stuck on the display screen D and has, on the other side, a skin layer for preventing damage to the film. Further, the film main body 20 has substantially the same size and shape as the display screen D, the positioning holes 21, 22, and 23 are located at an end portion in the longitudinal direction of the film main body 20, and the release layer is divided into two parts at an intermediate portion in the longitudinal direction.

Figure 4A:
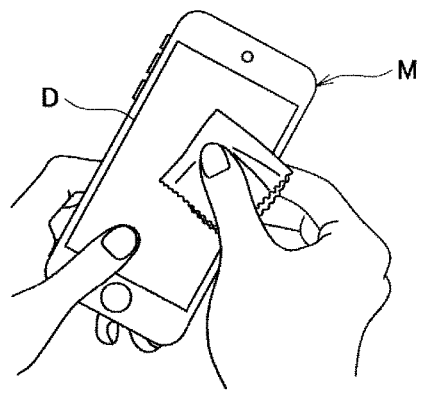
FIG. 4A is an explanatory diagram showing a state where the screen is being cleaned.
Figure 4B:
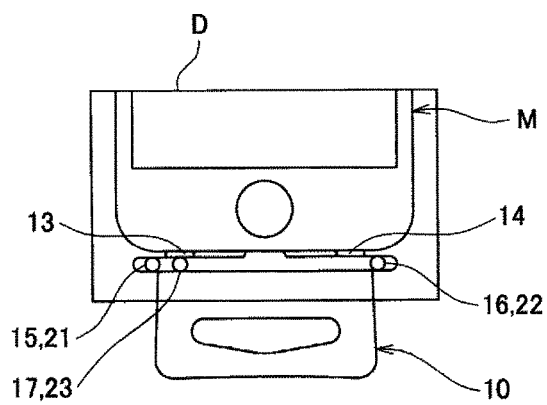
FIG. 4B is an explanatory diagram showing a state where the film holder is fixed to a mobile device.
Figure 4C:
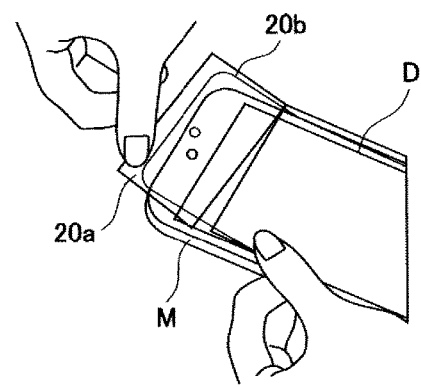
FIG. 4C is an explanatory diagram showing a state where half of the film in which a release layer is divided into two parts at an intermediate portion in a longitudinal direction is being peeled off.

A method, of using the device 25 for sticking a film on a display screen according to the present invention, which is configured as described above, will be briefly described with reference to FIGS. 4A to 4C and the subsequent drawings. A user first wipes the display screen D of the mobile device M to remove dust or dirt (FIG. 4A). Subsequently, the engagement piece 11 is inserted into the connector C on the mobile device side.

Figure 3:
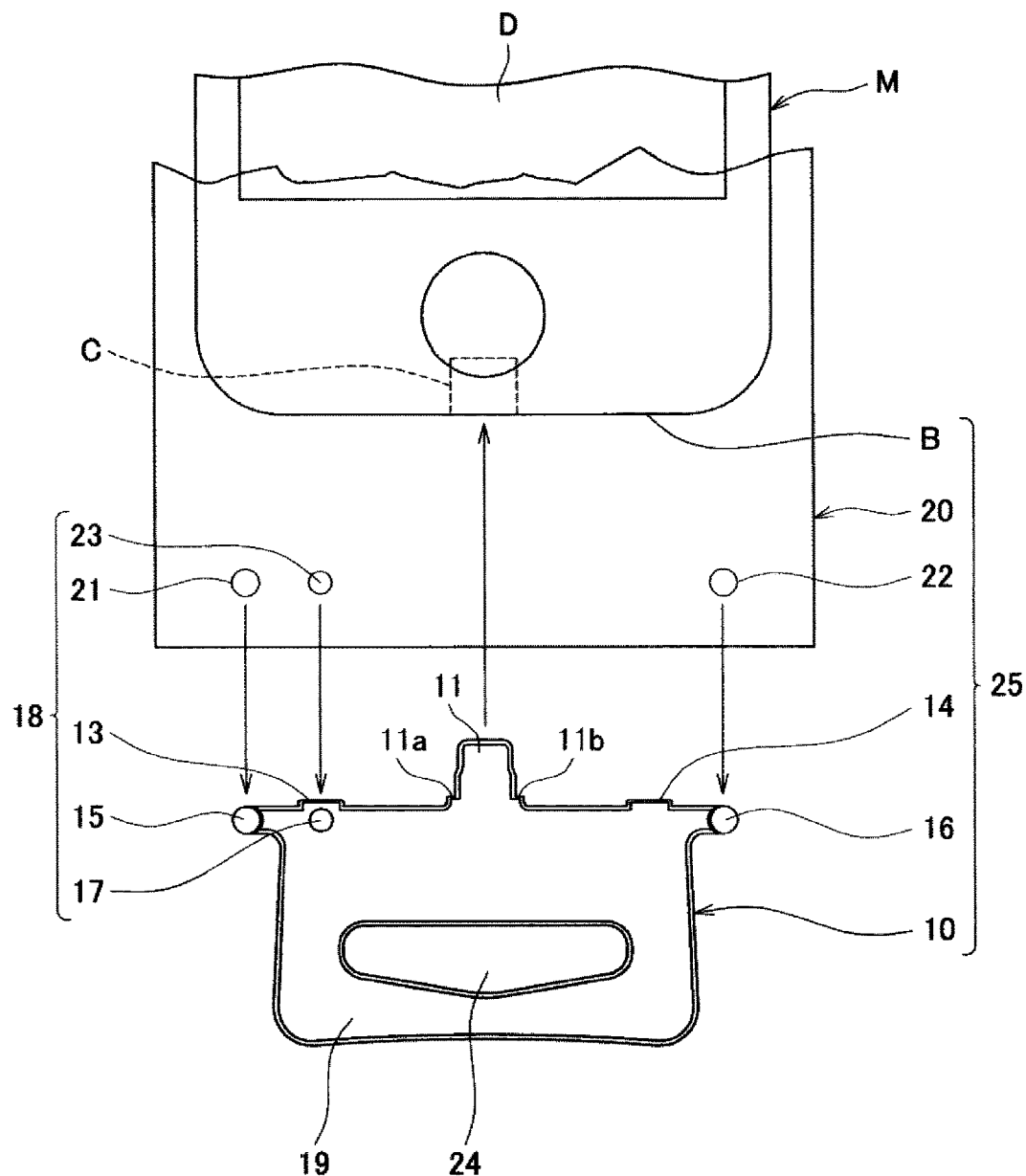
FIG. 3 is an explanatory plan view showing a positioning state between the film holder and a film main body in the device.

FIG. 3 also shows the process, and correct mounting can be confirmed by looking at the fact that the positioning projections 15, 16, and 17 of the inserted film holder 10 are present on the screen side. Next, the positioning holes 21, 22, and 23 are fitted to the positioning projections 15, 16, and 17. However, with this work, the small protrusion portions 11a, 11b, 13, and 14 come into contact with the lower side B of the mobile device M, the film main body 20 is superimposed on the display screen D of the mobile device M, and thus the positioning is correctly performed (FIG. 4B).

Figure 5A:
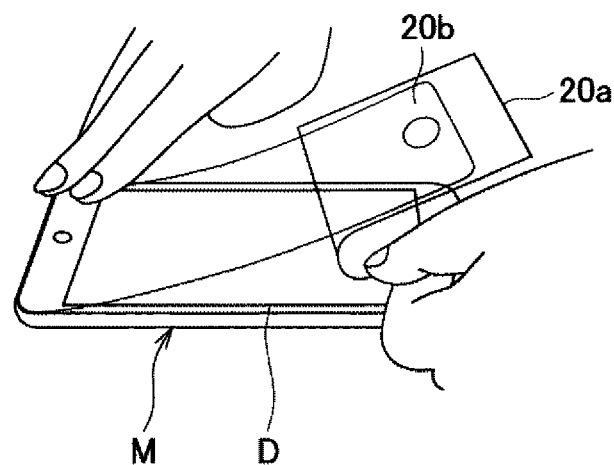
FIG. 5A is an explanatory diagram showing a state where the other half of the film divided into two parts is being peeled off.
Figure 5B:
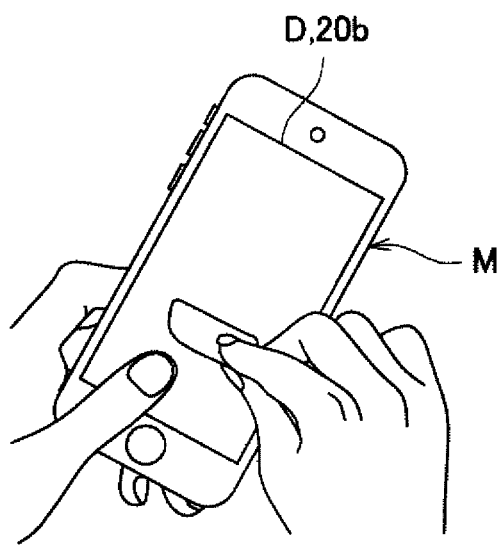
FIG. 5B is an explanatory diagram showing a state where remaining air bubbles are being removed.

The user peels off the upper half of a release layer 20a which is divided into two parts while visually confirming that the positioning of the film main body 20 has been already completed (FIG. 4C), and sticks the film 20b of the upper half on the display screen D. Subsequently, the user peels off the lower half of the release layer 20a which is divided into two parts (FIG. 5A) and sticks the film 20b of the lower half on the display screen D. Finally, in a case where air bubbles remain with the peeling-off of the release layer, the air bubbles are removed with a removing tool, whereby the work is finished (FIG. 5B).

REFERENCE NUMERALS

10: film holder
11: engagement piece
12: upper side
13, 14: small protrusion portion
15, 16: positioning projection
17: third positioning projection
18: positioning means
19: film holding plate part
20: film main body
21, 22: positioning hole
23: third positioning hole
24: opening portion
25: device

The invention claimed is:

1. A device for sticking a film on a display screen of a mobile device, the device comprising:
a film holder for sticking a film main body on the display screen, the film holder having a protruding engagement piece which is inserted into and fixed to a connector on a side of the mobile device which serves as an engagement partner,
wherein as a positioning means for the film main body, the film holder has at least two positioning projections and the film main body has the same number of positioning holes which are commensurate to the positioning projections.

2. The device for sticking a film on a display screen according to claim 1, wherein the film holder includes small protrusion portions which are provided on both right and left sides of the engagement piece interposed therebetween and come into contact with the side of the mobile device to position the device.

3. The device for sticking a film on a display screen according to claim 1, wherein three positioning projections and three positioning holes are provided, and the three positioning projections and the three positioning holes are disposed asymmetrically right-left, whereby the positional relationship between the film main body and the film holder is uniquely determined to prevent a positioning error.

* * * * *